Feb. 12, 1935. M. W. EXUM 1,990,861

TRAP

Filed Aug. 6, 1934

Witness
H. Woodard

Inventor
M. W. Exum

By H. B. Wilson Yeo
Attorneys.

Patented Feb. 12, 1935

1,990,861

UNITED STATES PATENT OFFICE 1,990,861

TRAP

Marion W. Exum, East St. Louis, Ill.

Application August 6, 1934, Serial No. 738,729

4 Claims. (Cl. 43—61)

The invention relates to improvements in traps of the type having a flexible line which must be held to hold the trap set, and animal-actuated means for releasing the line-holding means.

It is the object of the invention to provide exceptionally simple and inexpensive, yet efficient and sensitive means for normally holding the line, yet permitting the trap to be easily sprung.

The invention is shown in connection with a trap including a casing having a door which descends to entrap the prey but the features of improvement may of course be used in connection with other forms of traps.

Figure 1:
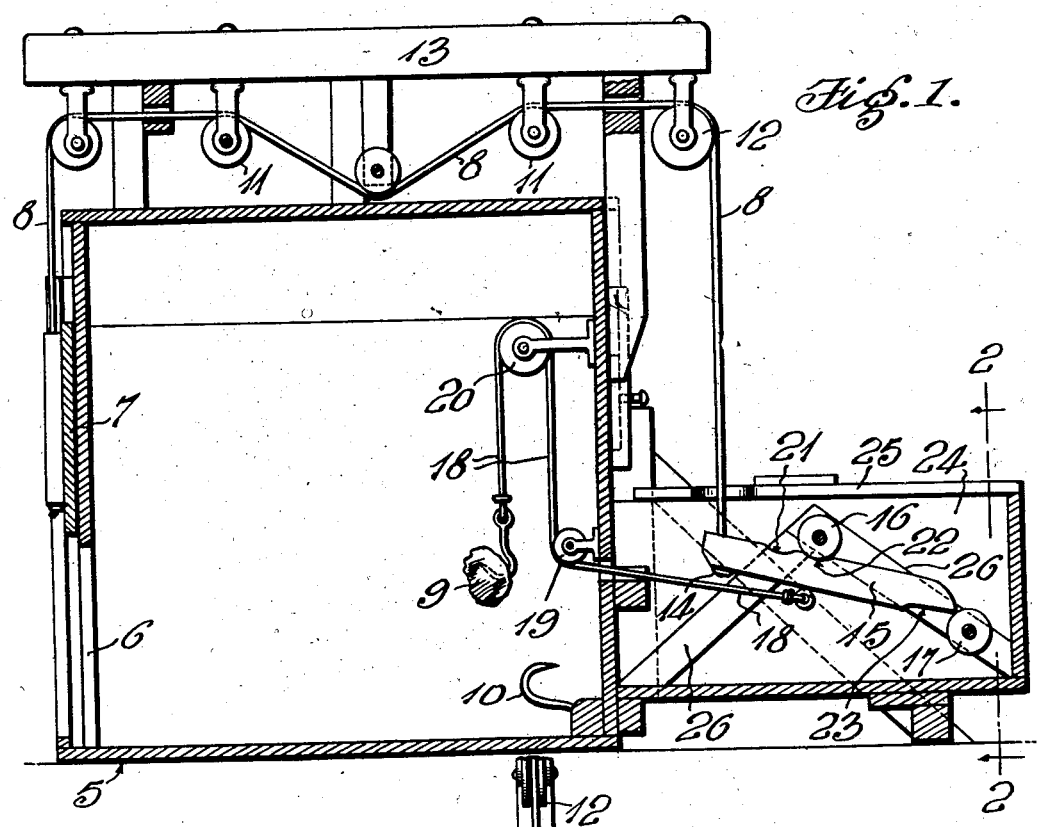

Fig. 1 of the accompanying drawing is a vertical longitudinal sectional view through a trap embodying the invention.

Figure 2:
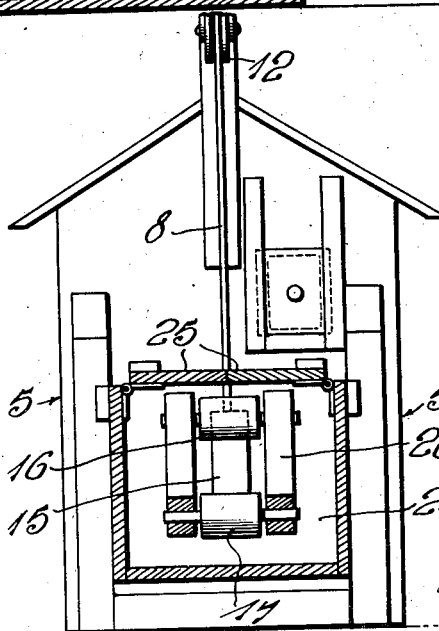

Fig. 2 is a vertical transverse sectional view on line 2—2 of Fig. 1.

In the drawing above briefly described, the numeral 5 denotes a trap housing of any desired construction having an entrance doorway 6 and a sliding door 7 for closing said doorway. A flexible line 8 of any desired nature is provided to hold the door 7 raised and to release said door when an animal enters the housing 5 and pulls upon the bait 9. The animal entrapped by descent of the door 7, in endeavoring to free himself, will downwardly claw upon the housing sides and if desired, sharp hooks 10 may be provided at the lower portions of said sides to impale the animal's front feet when making such attempts.

In the present showing, the line 8 is engaged with a plurality of pulleys 11 and with a wheel 12 mounted on a suitable framework 13 over the housing 5, the wheel 12 being disposed slightly in rear of said housing. The rear end of the cable 8 depends from the wheel 12 and is connected at 14 with one end of an anchoring bar 15, which bar is inserted between upper and lower rollers 16 and 17 or other suitable abutments. These rollers or abutments are stationarily mounted in position to engage longitudinally spaced portions of the anchoring bar 15 to hold the latter at an angle to the depending rear end of the line 8, thus effectively anchoring said line and holding the door 7 in raised position. A releasing line 18 is connected with the anchoring bar 15 and is trained around suitable guide pulleys 19 and 20, said releasing line having a depending end within the housing 5 to carry the bait 9. When an animal within the housing pulls upon this bait, the line 18 is pulled, thereby pulling the anchoring bar 15 longitudinally and freeing it from engagement with the rollers or abutments 16 and 17 and allowing the door 7 to descend.

Preferably, the upper side of the anchoring bar 15 is provided with two shallow depressions 21 and 22, either of which may engage the upper roller or abutment 16. When the depression 22 is engaged with this abutment or roller, the rear end of the bar 15 barely engages the lower abutment or roller 17 with the result that the trap may be released by a very slight pull upon the bait 9. When the depression 21 is engaged with the upper abutment or roller 16 however, the bar 15 extends completely over the lower roller or abutment 17 and a harder pull upon the bait is required to trip the trap. With the same trap structure therefore, relatively small and large animals may be trapped. The lower side of bar 15 may be formed with a shallow depression 23 to engage the roller or abutment 17 when the depression 21 engages the upper roller or abutment 16.

I prefer to provide an auxiliary housing 24 behind the housing 5, in which to place the parts 15, 16 and 17 so that the trap cannot be accidentally released. This auxiliary housing may constitute a rearward extension of the housing 5 and it may be provided with a top formed of hinged sections 25 which may be opened to permit easy engagement of the anchoring bar 15 with the rollers or abutments 16 and 17. While these rollers or abutments could of course be mounted in the housing 24 in any suitable way, I have shown a rigid frame structure 26 within said housing to carry said rollers or abutments.

Excellent results may be obtained from the general construction shown and described and it may therefore be followed if desired. However, within the scope of the invention as claimed, numerous variations may be made and obviously the invention is not restricted to any particular sizes or materials.

I claim:—

1. In a trap having a flexible line for holding it set; an anchoring bar connected with said line, two stationary abutments mounted to engage longitudinally spaced portions of said anchoring bar at opposite sides of the latter, said abutments being positioned to hold said anchoring bar at an angle to the adjacent portion of the line, and animal-actuated means for pulling said anchoring bar longitudinally to release it from engagement with said abutments.

2. In a trap having a flexible line for holding it set; an anchoring bar connected with said line, two stationary rollers mounted to engage longitudinally spaced portions of said anchoring bar at opposite sides of the latter, said rollers being positioned to hold said anchoring bar at an angle to the adjacent portion of the line, and animal-actuated means for pulling said anchoring bar longitudinally to release it from engagement with said rollers.

3. A structure as specified in claim 1; said anchoring bar having at least one shallow depression to engage one of said abutments.

4. A structure as specified in claim 2; said anchoring bar having at least one shallow depression to engage one of said rollers.

MARION W. EXUM.